(12) United States Patent
Hong et al.

(10) Patent No.: US 8,580,113 B2
(45) Date of Patent: Nov. 12, 2013

(54) METHOD FOR UTILIZING INTERNALLY GENERATED BIOGAS FOR CLOSED MEMBRANE SYSTEM OPERATION

(75) Inventors: Youngseck Hong, Burlington (CA); Reid Allyn Bayly, Toronto (CA); Domenico Salasso, Hamilton (CA); Jeffrey Ronald Cumin, Hamilton (CA); David Eaton Sproule, Carlisle (CA); Sheng Chang, Oakville (CA)

(73) Assignee: Zenon Technology Partnership, Wilmington, DE (US)

( * ) Notice: Subject to any disclaimer, the term of this patent is extended or adjusted under 35 U.S.C. 154(b) by 532 days.

(21) Appl. No.: 12/872,232

(22) Filed: Aug. 31, 2010

(65) Prior Publication Data

US 2012/0048801 A1    Mar. 1, 2012

(51) Int. Cl.
    *C02F 3/28*    (2006.01)
(52) U.S. Cl.
    USPC ........................................... 210/603
(58) Field of Classification Search
    USPC ............................................ 210/603, 416.1
    See application file for complete search history.

(56) References Cited

U.S. PATENT DOCUMENTS

| | | | |
|---|---|---|---|
| 6,299,774 B1 * | 10/2001 | Ainsworth et al. | 210/603 |
| 6,616,843 B1 * | 9/2003 | Behmann et al. | 210/605 |
| 7,645,385 B2 * | 1/2010 | Martin et al. | 210/614 |
| 8,308,946 B2 * | 11/2012 | Smith | 210/603 |
| 2006/0231488 A1 * | 10/2006 | McCune-Sanders | 210/603 |
| 2008/0223783 A1 | 9/2008 | Sutton | |
| 2009/0305379 A1 * | 12/2009 | Johnson et al. | 435/170 |

FOREIGN PATENT DOCUMENTS

| JP | 3-131397 A | * | 6/1991 |
|---|---|---|---|
| JP | 11-147098 A | * | 6/1999 |

OTHER PUBLICATIONS

Machine-generated English translation of JP 11-147098, generated Jan. 22, 2013.*
Vallero, M.V.G. et al., High rate sulfate reduction in a submerged anaerobic membrane bioreactor (SAMBaR) at high salinity, Journal of Membrane Science, vol. 253, Mar. 21, 2005, pp. 217-232.
Jeison, D. et al., Cake layer formation in anaerobic submerged membrane bioreactors (AnSMBR) for wastewater treatment, Journal of Membrane Science, vol. 284, Aug. 1, 2006, pp. 227-236.
Jeison, D. et al., Thermophilic treatment of acidified and partially acidified wastewater using an anaerobic submerged MBR: Factors affecting long-term operational flux, Water Research, vol. 41, Sep. 2007, pp. 3868-38789.

* cited by examiner

*Primary Examiner* — Fred Prince
(74) *Attorney, Agent, or Firm* — Scott Pundsack; Borden Ladner Gervais LLP

(57) ABSTRACT

In an anaerobic membrane bioreactor ("MBR"), a closed anaerobic process tank contains a membrane filter or is connected to an external tank containing a membrane filter. A pocket of biogas accumulates at the top of the process tank. Biogas is taken from the pocket, pumped to the bottom of the membrane filter to provide bubbles to inhibit membrane fouling, and returned to the pocket. Excess biogas produced as the wastewater is degraded is removed from the system and may be used as a product. However, biogas and liquid are maintained in the system at a pressure above atmospheric, for example 10 kPa or more above atmospheric pressure, sufficient to provide at least a material contribution to the transmembrane pressure driving permeation through the membranes. The overall energy requirements of the system may be reduced. Further, with sufficient pressure, suction pumps attached to the membranes may not be required.

8 Claims, 2 Drawing Sheets

AnMBR WITH A MEMBRANE FILTER SUBMERGED IN PROCESS TANK

METHOD FOR UTILIZING INTERNALLY GENERATED BIOGAS FOR CLOSED MEMBRANE SYSTEM OPERATION

FIELD

This specification relates to anaerobic membrane bioreactors and process for operating them, for example to treat wastewater.

BACKGROUND

The following is not an admission that anything described below is prior art or common general knowledge.

In wastewater treatment plants, one of the available unit processes may involve treatment of the wastewater with anaerobic microorganisms. Even though an anaerobic process tank may be open, in the absence of added oxygen, the prevailing conditions in the water in the tank may be anaerobic. Anaerobic microorganisms populate the tank and convert biologically degradable material in the wastewater primarily into water and biogas, which is primarily carbon dioxide and methane.

In membrane bioreactors, solid-liquid separation of the degrading or degraded wastewater is performed through a membrane filter. The membrane filter may be immersed directly into a process tank, or may be immersed in a separate tank with an inlet from a process tank and an outlet back to the same or another process tank. The membranes are typically in the microfiltration or ultrafiltration range. A flux of permeate (filtered water) may be drawn through the membranes by suction applied to an inside volume of the membrane filter.

INTRODUCTION

The following introduction is intended to introduce the reader to the detailed disclosure to follow and not to limit or define any claim. An invention may reside in a combination or subcombination of apparatus elements or process steps described in any part of this document including the Figures.

In an anaerobic membrane bioreactor ("AnMBR"), wastewater is digested or degraded by microorganisms in an anaerobic tank and solid-liquid separation of the wastewater is provided by way of membrane filtration. In the membrane filtration system, a desired flux is obtained by creating a transmembrane pressure differential (TMP) across the membrane surface, typically by attaching a suction pump to an inside surface of the membrane filter. In an apparatus and process descried herein, an anaerobic process tank is closed to allow for the biogas generated by microorganisms digesting wastewater to be collected. Some of the collected biogas is accumulated in the tank and internal tank pressure is maintained, by way of the accumulation of the biogas, feed wastewater pressure or both, at a pressure above ambient. The above ambient pressure is applied to provide part or all of the TMP driving flux through the membrane filter.

In greater detail, an anaerobic process tank is closed in the sense that it is pressurisable though provided with an inlet for pumped or gravity fed wastewater and an outlet for product biogas. The closed process tank contains a membrane filter or is connected to an external tank containing a membrane filter. In the case of an external membrane tank, process liquid recirculates from the process tank through the membrane tank and back to the process tank. A pocket of biogas accumulates at the top of the process tank. Biogas is taken from the pocket and pumped to the bottom of the membrane filter to provide bubbles to inhibit membrane fouling. In the case of an external membrane tank, biogas is taken from the pocket of the process tank, pumped to the bottom of the membrane filter in the membrane tank, recollected at the top of the membrane tank and returned to the process tank.

Biogas is produced as the wastewater is degraded and collects at the top of the process tank. In the case of an external membrane tank, biogas may be produced in the membrane tank itself, and biogas is introduced into the membrane tank by way of gas circulation to provide bubbles. Excess biogas is removed from the process tank, the membrane tank or both. The removed biogas is a product that can be used, for example, as a fuel burned to generate electricity. In steady state operation, the rate of biogas removal is generally equal to the rate of biogas creation. However, by temporarily or periodically limiting or stopping biogas removal, biogas is accumulated to increase the pressure of the biogas pocket above the water surface in the process tank and the membrane tank, if any. The biogas pressure may be, for example, 10 kPa or more above atmospheric pressure. Maintaining the membrane tank, or a process tank containing membranes, at a pressure above atmospheric creates a transmembrane pressure that provides, or at least increases, permeate flux through the membrane filter. The overall energy requirements of the system may be reduced. Further, with sufficient pressure in the membrane tank, suction pumps attached to the membranes may no longer be required.

DRAWINGS

DESCRIPTION OF VARIOUS EMBODIMENTS

In an anaerobic process, the digestion of organic matter in the wastewater produces a biogas that escapes from the surface of the wastewater. For example, 1 g COD of glucose can produce about 0.7 L of biogas (carbon dioxide and methane) at 1 atm and 0° C. When additional biogas is produced into a fixed volume, the pressure increases above 1 atm. In the process and apparatus described below, some of the biogas produced is collected and maintained in an AnMBR system at above ambient pressure. The wastewater contact with a membrane filter in the AnMBR system is kept in communication with the collected biogas. The wastewater in contact with the membrane filter is also maintained above ambient pressure, which assists in providing a required TMP or flux. In particular, a rate of COD input (or another parameter that can be correlated with a rate of decomposition of organic materials) is correlated with a rate of biogas generation. The rate of biogas generation is correlated with internal pressure in a system operated with a minimum wastewater depth, and with pressure of wastewater in contact with the membrane filter. Pressure of wastewater in contact with the membrane filter is then correlated with TMP and flux. In this way, an AnMBR system can utilize biologically generated biogas to produce or enhance a membrane filtration driving force (TMP). Producing TMP may use 10 to 20% of the energy required by a conventional membrane bioreactor.

Optionally, the pressure of wastewater in contact with the membrane filter can be made high enough to avoid the need for a permeate suction pump. This reduces the total capital and operational costs of the bioreactor. For example, a large AnMBR system might have a plurality of membrane trains, either each in its own tank or in a common tank, with a permeate pump associated with each train. Even if a feed pump must be increased in size to overcome additional pressure in the system, the cost of purchasing, housing, installing and maintaining one large pump is generally less than the cost of purchasing, housing, installing and maintaining two or more separate pumps of the same total capacity. Further, even if the biogas creates pressure against the feed pump, the total system energy consumption is likely to be reduced. This is because one large pump tends to use less energy that two or more smaller pumps providing the same total flow rate and pressure differential. However, in some cases the wastewater can be fed to the system entirely or in part by gravity. The static pressure differential between a source of raw wastewater and the bioreactor is used to overcome some or all of the biogas pressure in the system. In this case, using the biogas to produce TMP provides a greater energy savings, and an energy savings even if permeate pumps are still used.

Figure 1:
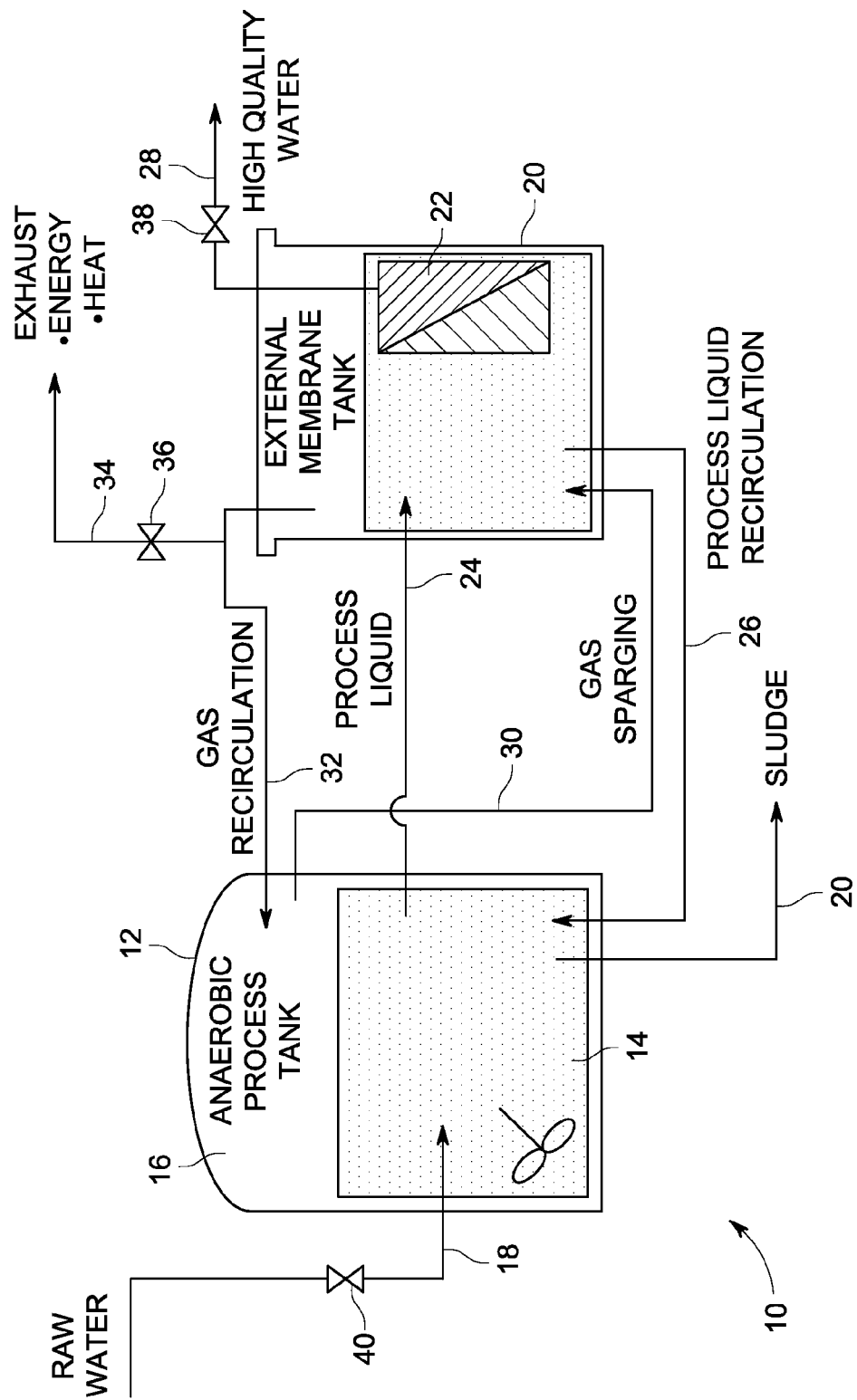
FIG. 1 is a schematic diagram of an anaerobic MBR with an external membrane tank.

FIG. 1 shows a first anaerobic membrane bioreactor 10. An anaerobic digester process tank 12 comprises a wastewater area 14 and a headpsace 16. Raw wastewater enters the wastewater area 14 through a feed line 18, typically by way of a pump or gravity feed. Digested waste sludge leaves the process tank 12 through a drain 20. The bioreactor 10 also has a distinct membrane tank 20 containing an immersed membrane filter 22. The membrane filter 22 is preferably in the microfiltration or ultrafiltration range. The membrane filter 22 is also preferably arranged for outside-in flow and made to a solids tolerant design, for example using flat sheet membranes or reinforced hollow fiber membranes. Both of the process tank 12 and membrane tank 20 are sealed in the sense that, although they have various inlets and outlets, they are still pressurisable without material biogas leaking.

Wastewater being treated recirculates between the process tank 12 and the membrane tank 20. Wastewater flows from the process tank 12 to the membrane tank 20 through a process liquid line 24. A portion of the wastewater entering the membrane tank 20 permeates through the membrane filter 22 and leaves the membrane tank 20 through a permeate line 28. Retained wastewater flows from the membrane tank 20 to the process tank 12 through a process liquid recirculation line 26. On average, the flow rate in the process liquid recirculation line 26 is less than the flow rate in process liquid line 24 by the rate of permeate produced through the permeate line 28. Typically, flow in one direction between the process tank 12 and the membrane tank by a pump (not shown), and in the other direction by a pump or by a difference in pressure in the wastewater between the tanks 12, 20.

Biogas is created by microorganisms digesting the wastewater, and travels into the headspace 16. Some biogas is taken from the headspace 16 and passes through a gas sparging line 30 into the membrane tank 20, typically by way of a pump (not shown) in the gas sparging line. The biogas typically enters the membrane tank 20 through a gas sparger (not shown) near or below the bottom of the membrane filter 22. The gas is released as bubbles, which rise through or in contact with the membrane filter 22 to inhibit fouling of the membranes and generate liquid flow through the membrane filter 22. The bubbles burst at the surface of wastewater in the membrane tank 20 and release biogas into a pocket at the top of the membrane tank 20. The released biogas then returns to the process tank 12 through a gas recirculation line 32. By managing the process liquid recirculation and the pump in the gas sparging line 30, or both, the biogas in the membrane tank 20 can be kept at slightly higher pressure then the biogas in the process tank 12 to drive the return of biogas to the process tank 12.

Biogas is initially allowed to accumulate in the system 10 to create a pocket of biogas at least in the headspace 16 at a desired pressure. Thereafter, continued generation of biogas allows the pocket to be maintained above a desired combination of volume and pressure while also exhausting biogas. Exhausted biogas can be used as a fuel, for example burned to create heat, steam or electricity.

Biogas exhausts through a vent line 34 connected, for example, to the headspace 16 or the gas recirculation line 32. The vent line 34 has an exhaust valve 36 that is controlled to open when gas pressure in the system 10 exceeds a predetermined maximum and closes when gas pressure falls below a predetermined minimum. The predetermined minimum biogas pressure is preferably chosen to provide at least a material enhancement to TMP and flux through the membrane filter 22. For example, the predetermined minimum may be 10 kPa or more above ambient pressure. Optionally, the predetermined minimum may be sufficient to itself provide a design flux and avoid the need for a permeate suction pump in the permeate line 28. For example, the predetermined minimum may be 20 kPa or more.

Figure 2:
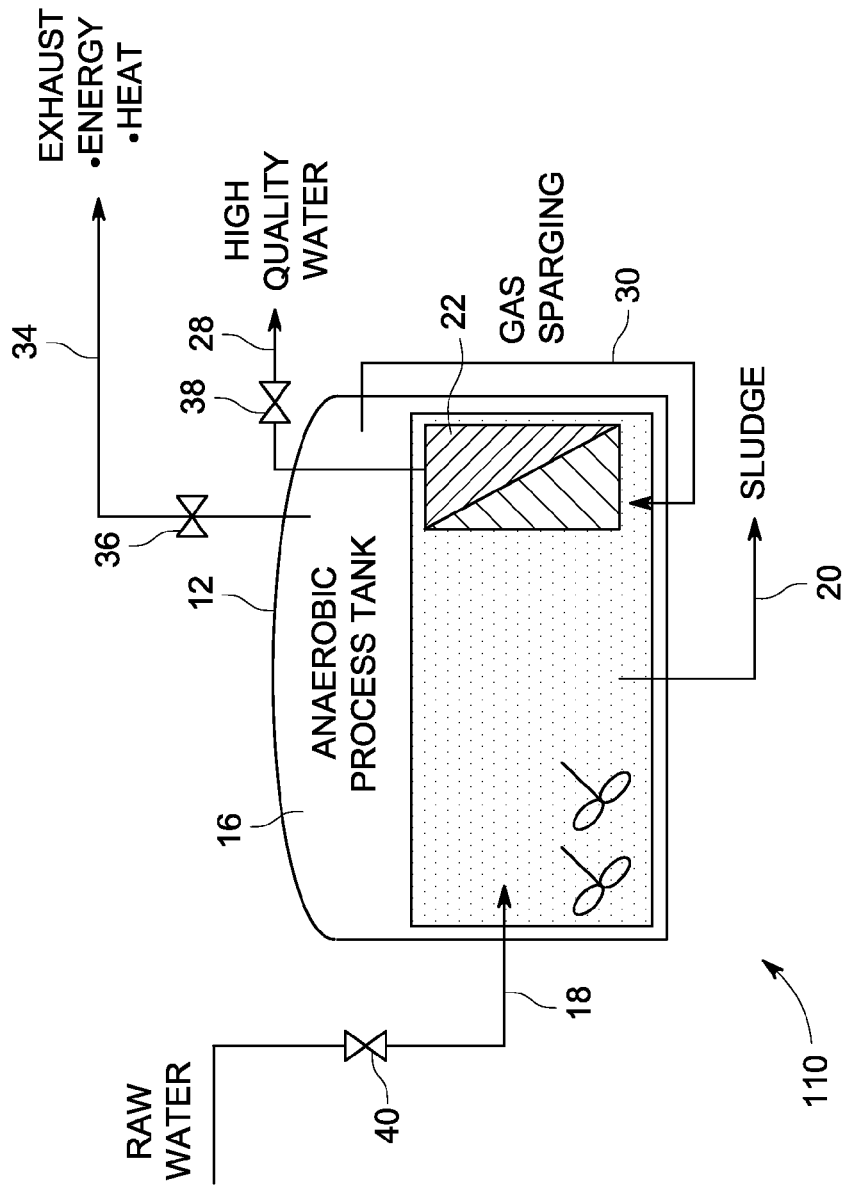
FIG. 2 is a schematic diagram of an anaerobic MBR with a membrane filter submerged in a process tank.

FIG. 2 shows an alternative anaerobic membrane bioreactor 110 in which a membrane filter 22 is immersed directly into the wastewater area 14 of a process tank 12. There is no separate membrane tank and no process liquid lines 24, 26 or gas recirculation line 32. The gas sparging line 30 is reconfigured to take biogas from the headspace 16 and eject the biogas to provide bubbles near or below the bottom of the membrane filter 22. The configuration and operation of other components is as described in relation to FIG. 1.

Optionally, raw wastewater may be added to the anaerobic membrane bioreactor 10, 110 in a batch feeding process to reduce the feed pump energy consumption, or to allow gravity feed flow to be used even when the driving static head pressure is not large. In this process, raw wastewater is added to the process tank 12 only after the biogas has been temporarily vented from the process tank 12 so that a raw wastewater pump does not need to overcome the biogas pressure. To start the process, a permeate valve 38 in the permeate line 28 is closed and the exhaust valve 36 is opened to release the pressure from the headspace of the process tank 12. A small residual pressure, for example 1 kPa above atmospheric pressure, may be left in the headspace to prevent outside air from leaking into the process tank 12. An inlet valve 40 in the feed line 18 is opened, and a feed pump is turned on if flow is not by gravity, to add raw wastewater to the process tank 12. When a batch of raw wastewater has been added, the feed pump if any is turned off and the inlet valve 40 is closed, and the exhaust valve 36 is closed. Biogas is allowed to accumulate in the anaerobic membrane bioreactor 10, 110 until a threshold pressure, for example 10 kPa above atmospheric pressure, is reached in the process tank 12. The permeate valve 38 is then opened to commence permeation. The exhaust valve 36 may be opened from time to time to remove excess biogas during permeation as described above. When another batch of raw wastewater is required, the feeding process is repeated.

The invention protected by this document is defined by the following claims. The claims are not limited to the specific examples of apparatus or process described herein. A particular claim might not require every element or step of any single apparatus or process described herein, or every element or step that is common to a plurality of the apparatus or process described herein.

We claim:

1. A process for degrading a wastewater and producing a biogas comprising the steps of, a) providing a system comprising (i) a closed anaerobic process tank having an area for holding the wastewater and a headspace for holding biogas produced by degrading the wastewater; (ii) a pumped supply of wastewater to the process tank; (iii) a membrane filter in the process tank or in a closed external tank in liquid recirculating communication with the process tank; (iv) a biogas circulation circuit adapted to withdraw biogas from the headspace, discharge the biogas as bubbles below or near the bottom of the membrane filter, and return biogas to the headspace; (v) an outlet to remove permeate through the membrane filter; and, (vi) an outlet to remove product biogas from the system;

b) maintaining a pressure in the headspace and in wastewater in communication with the membrane filter of at least 10 kPa more than ambient pressure sufficient to at least materially contribute to producing a flux of permeate through the membrane filter.

2. The process of claim 1 wherein the pressure maintained in the wastewater in communication with the membrane filter produces a design flux of permeate through the membrane filter without pump produced suction applied to the permeate side of the membrane filter.

3. The process of claim 1 wherein the membrane filter is located within a closed external tank in liquid recirculating communication with the process tank, the external tank has a wastewater area in which the membrane filter is immersed and a biogas headspace above the wastewater area, and the biogas circulation circuit comprises a pump, a conduit in communication between the headspace and the pump, a gas sparger below or near the bottom of the membrane filter, a conduit in communication between the pump and the gas sparger and a conduit in communication between the head space of the external tank and the process tank.

4. The process of claim 1 wherein the membrane filter is located within the process tank and the biogas circulation circuit comprises a pump, a conduit in communication between the headspace and the pump, a gas sparger below or near the bottom of the membrane filter, and a conduit in communication between the pump and the gas sparger.

5. The process of claim 1 comprising a step of temporarily or periodically limiting or stopping biogas removal from the apparatus to accumulate or maintain at least a predetermined amount of biogas in the headspace.

6. The process of claim 1 wherein biogas is exhausted from the system when the pressure of the biogas exceeds a predetermined minimum.

7. The process of claim 6 wherein a depth of wastewater in the system is kept above a predetermined minimum.

8. A process for withdrawing permeate through a membrane filter in an anaerobic bioreactor comprising maintaining wastewater in the bioreactor in communication with the membrane filter at a pressure at least 10 kPa above ambient, maintaining a pocket of biogas produced by degradation of the wastewater at a pressure at least 10 kPa above ambient, and withdrawing biogas from the pocket to produce bubbles of the biogas below or near the bottom of the membrane filter.

* * * * *